United States Patent
Long, Jr. et al.

(10) Patent No.: US 6,796,207 B1
(45) Date of Patent: Sep. 28, 2004

(54) MACHINE TOOL SUPPORT APPARATUS

(76) Inventors: Paul W. Long, Jr., 2934 Waterford Rd., Winston-Salem, NC (US) 27106; Jared R. Anderson, 2049 Bethlehem Church Rd., Reidsville, NC (US) 27320

( * ) Notice: Subject to any disclaimer, the term of this patent is extended or adjusted under 35 U.S.C. 154(b) by 182 days.

(21) Appl. No.: 10/215,592

(22) Filed: Aug. 9, 2002

(51) Int. Cl.$^7$ .......................... B23B 29/00; B23P 15/28; B23P 1/00

(52) U.S. Cl. .......................... 82/158; 82/161; 407/101; 407/107

(58) Field of Search .......................... 82/121, 158, 159, 82/160, 161, 900; 407/11, 87, 92, 101, 102, 107, 109, 110; 279/52, 53; 29/39, 41

(56) References Cited

U.S. PATENT DOCUMENTS

| | | | | |
|---|---|---|---|---|
| 1,435,873 A | * | 11/1922 | Petersen | 82/158 |
| 1,720,820 A | * | 7/1929 | Bruce | 407/79 |
| 3,678,790 A | | 7/1972 | Riley | |
| 4,183,270 A | * | 1/1980 | Castagne | 82/159 |
| 4,614,469 A | | 9/1986 | Beere et al. | |
| 4,661,029 A | * | 4/1987 | Miller | 409/233 |
| 4,682,521 A | * | 7/1987 | Duenas | 82/158 |
| 5,405,155 A | | 4/1995 | Kanaan et al. | |
| 5,417,131 A | * | 5/1995 | Robertson | 82/158 |
| D370,019 S | | 5/1996 | Stewart | |
| 5,975,817 A | | 11/1999 | Komine | |
| 5,988,960 A | | 11/1999 | Hasler | |
| 6,076,441 A | * | 6/2000 | Billington | 82/160 |

* cited by examiner

*Primary Examiner*—A. L. Wellington
*Assistant Examiner*—Brian D. Walsh

(57) ABSTRACT

The machine tool support apparatus includes an elongate bar member that comprises a mounting portion and a collet portion. The mounting portion is releasably attachable to a machine mount of a turning machine. The collet portion includes a main aperture that extends therethrough. A collet retaining assembly selectively receives a plurality of collet assemblies which are releasably attachable to the bar member and secure machine tools to the machine mount during a machining operation. A retaining pin restricts rotational movement of each of the collet assemblies with respect to the bar member. A positioning assembly selectively positions the bar member along a longitudinal axis of the bar member with respect to the machine mount. A coolant assembly applies coolant to the machine tool during a tooling operation. A lubrication assembly permits selective lubrication of the main aperture of the collet portion and the positioning assembly.

18 Claims, 6 Drawing Sheets

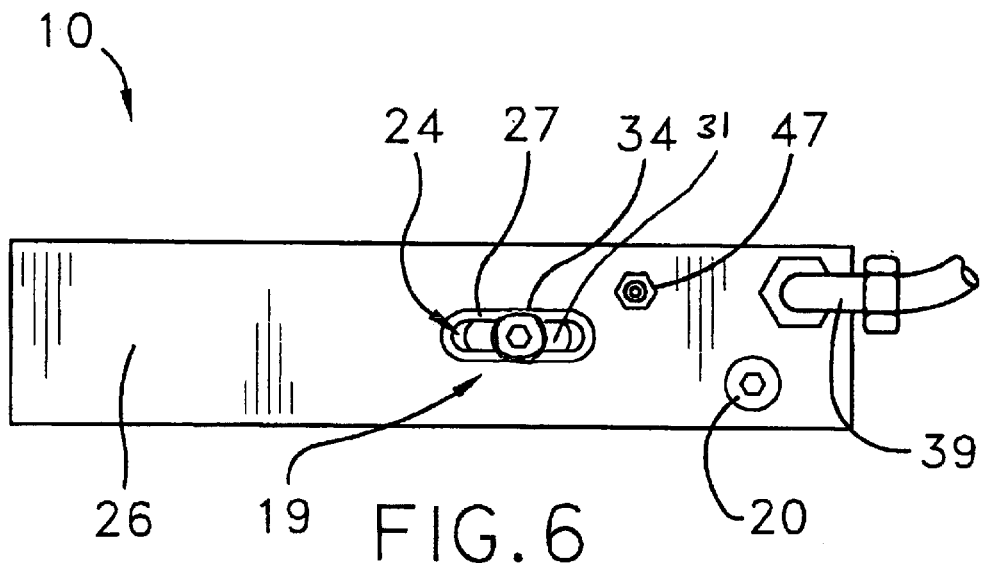
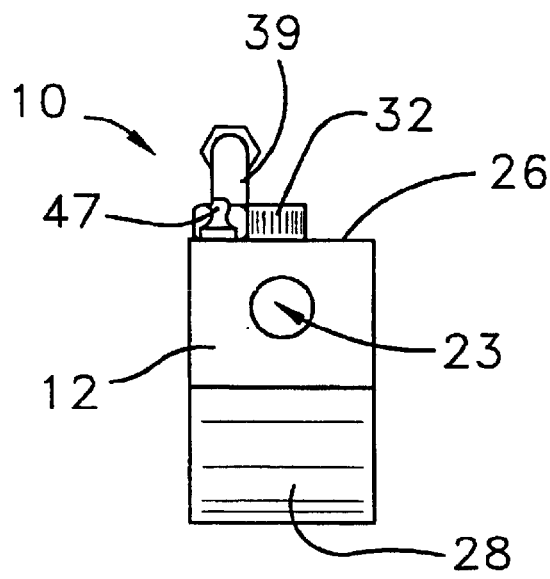
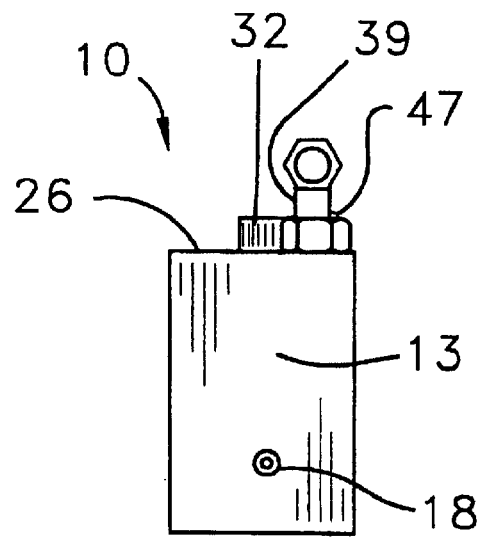

MACHINE TOOL SUPPORT APPARATUS

BACKGROUND OF THE INVENTION

1. Field of the Invention

The present invention relates to tool holders and more particularly pertains to a new machine tool support apparatus for attaching a machine tool to a machine mount of a lathe or turning machine.

2. Description of the Prior Art

The use of tool holders is known in the prior art. More specifically, tool holders heretofore devised and utilized are known to consist basically of familiar, expected and obvious structural configurations, notwithstanding the myriad of designs encompassed by the crowded prior art, which have been developed for the fulfillment of countless objectives and requirements.

Known prior art includes U.S. Pat. No. 3,678,790 that teaches a loading device for a machine tool which comprises a gripping assembly using a sticking taper wedge action which can be extracted solely by an axially directed extraction force applied to the work piece. The patent does not encompass the means or method to mount the loading device on a lathe or turning machine.

U.S. Pat. No. 4,614,469 teaches a tool holder with a plurality of openings and collet retainers that hold multiple work pieces through the agency of hydraulic or fluid pressure. The patent does not encompass the means or method to mount the tool holder on a lathe or turning machine.

U.S. Pat. No. 5,405,155 teaches a collet or tool gripping assembly that forms a seal about the about the inner and outer surface of the collet for sealing the gripping surfaces against the flow of coolant. The patent does not encompass the means or method to mount the tool holder on a lathe or turning machine.

U.S. Pat. No. 5,975,817 teaches an improved tool holder which is designed to efficiently hold a wider variety of tool sizes while maintaining coolant seal capability. The patent does not encompass the means or method to mount the tool holder on a lathe or turning machine.

U.S. Pat. No. 5,988,960 similar to U.S. Pat. No. 4,614,469 teaches a tool holder with a plurality of openings and collet retainers that hold multiple work pieces. The patent does not encompass the means or method to mount the tool holder on a lathe or turning machine.

U.S. Pat. No. Des. 370,019 teaches the ornamental aspects of a quick change lathing tool comprising a screw mounted carbide holder. The design does not anticipate the use of a collet or coolant system.

While these devices fulfill their respective, particular objectives and requirements, the aforementioned patents do not disclose a new machine tool support apparatus. The inventive device includes an elongate bar member that comprises a mounting portion and a collet portion. The mounting portion is releasably attachable to a machine mount of a turning machine. The collet portion includes a main aperture that extends therethrough. A collet retaining assembly selectively receives a plurality of collet assemblies which are releasably attachable to the bar member and secure machine tools to the machine mount during a machining operation. A retaining pin restricts rotational movement of each of the collet assemblies with respect to the bar member. A positioning assembly selectively positions the bar member along a longitudinal axis of the bar member with respect to the machine mount. A coolant assembly applies coolant to the machine tool during a tooling operation. A lubrication assembly permits selective lubrication of the main aperture of the collet portion and the positioning assembly.

In these respects, the machine tool support apparatus according to the present invention substantially departs from the conventional concepts and designs of the prior art, and in so doing provides an apparatus primarily developed for the purpose of attaching a machine tool to a machine mount of a lathe or turning machine.

SUMMARY OF THE INVENTION

In view of the foregoing disadvantages inherent in the known types of tool holders now present in the prior art, the present invention provides a new machine tool support apparatus construction wherein the same can be utilized for attaching a machine tool to a machine mount of a lathe or turning machine.

The general purpose of the present invention, which will be described subsequently in greater detail, is to provide a new machine tool support apparatus apparatus and method which has many of the advantages of the tool holders mentioned heretofore and many novel features that result in a new machine tool support apparatus which is not anticipated, rendered obvious, suggested, or even implied by any of the prior art tool holders, either alone or in any combination thereof.

To attain this, the present invention generally comprises an elongate bar member that comprises a mounting portion and a collet portion. The mounting portion is releasably attachable to a machine mount of a turning machine. The collet portion includes a main aperture that extends therethrough. A collet retaining assembly selectively receives a plurality of collet assemblies which are releasably attachable to the bar member and secure machine tools to the machine mount during a machining operation. A retaining pin restricts rotational movement of each of the collet assemblies with respect to the bar member. A positioning assembly selectively positions the bar member along a longitudinal axis of the bar member with respect to the machine mount. A coolant assembly applies coolant to the machine tool during a tooling operation. A lubrication assembly permits selective lubrication of the main aperture of the collet portion and the positioning assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new machine tool support apparatus apparatus and method which has many of the advantages of the tool holders mentioned heretofore and many novel features that result in a new machine tool support apparatus which is not anticipated, rendered obvious, suggested, or even implied by any of the prior art tool holders, either alone or in any combination thereof.

It is another object of the present invention to provide a new machine tool support apparatus which may be easily and efficiently manufactured and marketed.

It is a further object of the present invention to provide a new machine tool support apparatus which is of a durable and reliable construction.

An even further object of the present invention is to provide a new machine tool support apparatus which is susceptible of a low cost of manufacture with regard to both materials and labor, and which accordingly is then susceptible of low prices of sale to the consuming public, thereby making such machine tool support apparatus economically available to the buying public.

Still yet another object of the present invention is to provide a new machine tool support apparatus which provides in the apparatuses and methods of the prior art some of the advantages thereof, while simultaneously overcoming some of the disadvantages normally associated therewith.

Still another object of the present invention is to provide a new machine tool support apparatus for attaching a machine tool to a machine mount of a lathe or turning machine.

Yet another object of the present invention is to provide a new machine tool support apparatus which includes an elongate bar member that comprises a mounting portion and a collet portion. The mounting portion is releasably attachable to a machine mount of a turning machine. The collet portion includes a main aperture that extends therethrough. A collet retaining assembly selectively receives a plurality of collet assemblies which are releasably attachable to the bar member and secure machine tools to the machine mount during a machining operation. A retaining pin restricts rotational movement of each of the collet assemblies with respect to the bar member. A positioning assembly selectively positions the bar member along a longitudinal axis of the bar member with respect to the machine mount. A coolant assembly applies coolant to the machine tool during a tooling operation. A lubrication assembly permits selective lubrication of the main aperture of the collet portion and the positioning assembly.

Still yet another object of the present invention is to provide a new machine tool support apparatus that provides in the apparatuses and methods of the prior art some of the advantages thereof, while simultaneously overcoming some of the disadvantages normally associated with tool set-up and change-out.

Even still another object of the present invention is to provide a new machine tool support apparatus for increased speed and convenience of tool set-up and/or change-out.

Even still another object of the present invention is to provide a new machine tool support apparatus that has a greatly reduced profile permitting positioning of the tool with respect to the workpiece in a more efficient manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a schematic side view of the present invention.

FIG. 7 is a schematic first end view of the present invention.

FIG. 8 is a schematic second end view of the present invention.

DESCRIPTION OF THE PREFERRED EMBODIMENT

Figure 1:
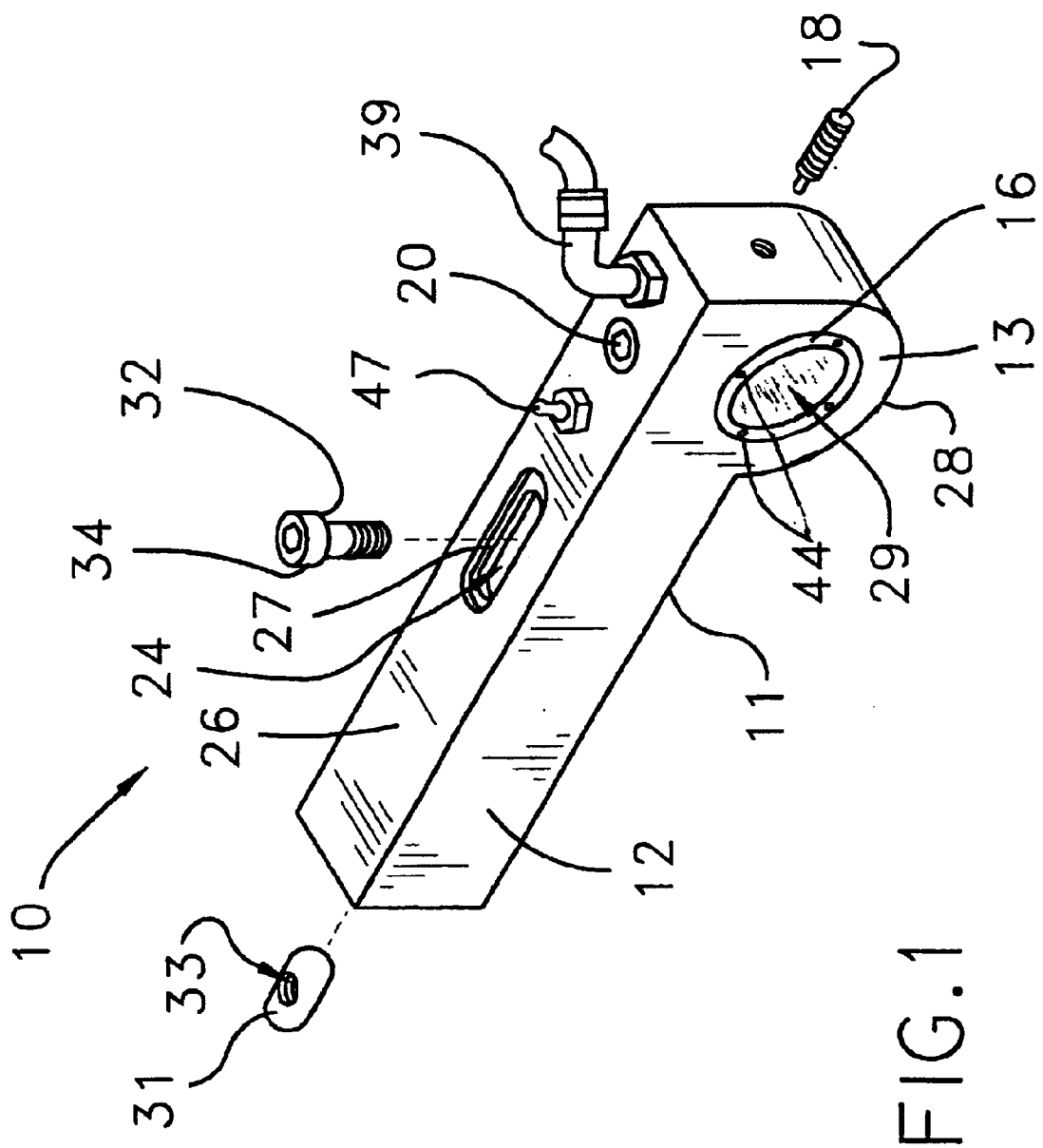
FIG. 1 is a schematic perspective view of a new machine tool support apparatus according to the present invention.
Figure 2:
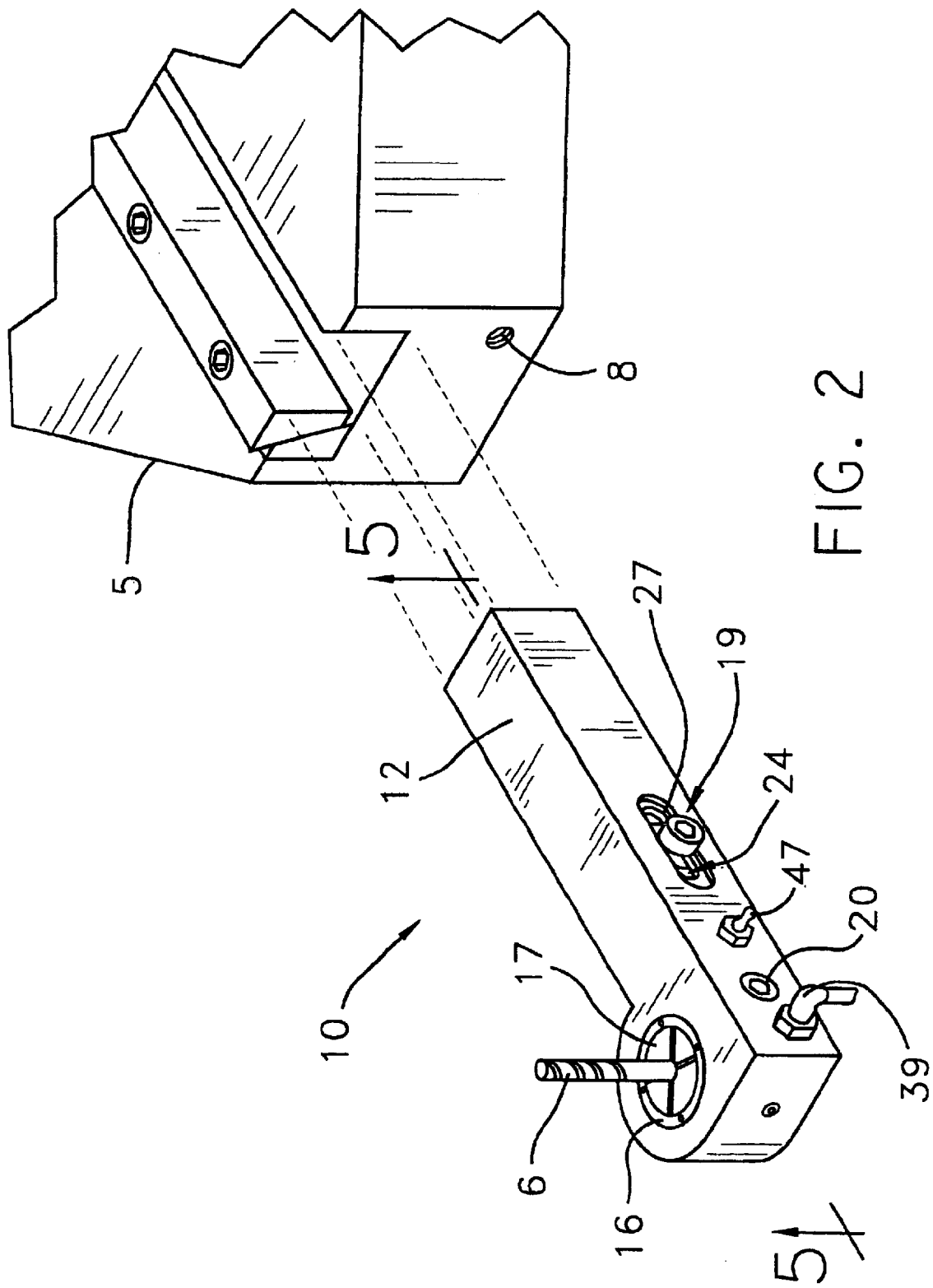
FIG. 2 is a schematic perspective view of the present invention prior to insertion in the machine mount.
Figure 3:
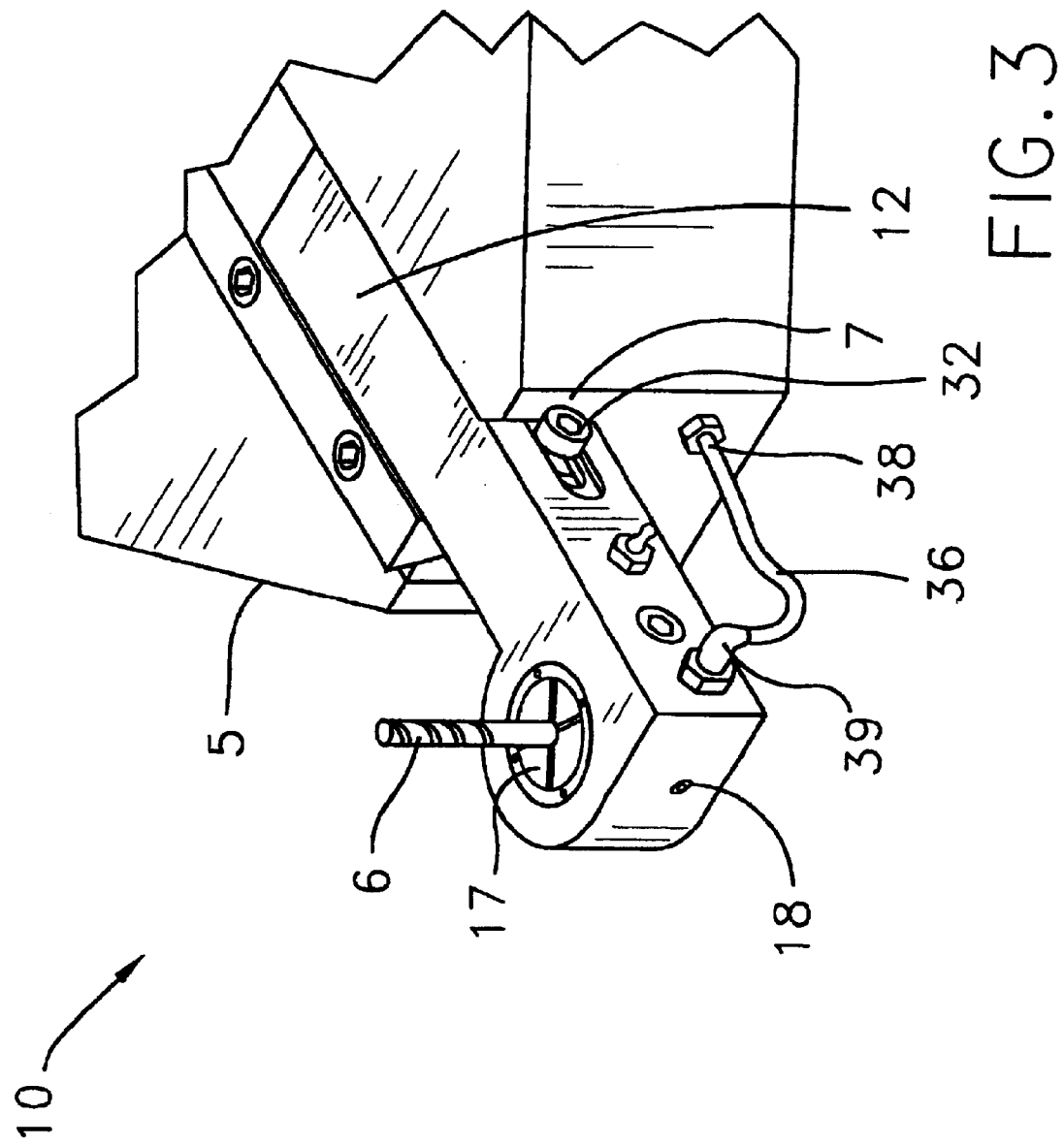
FIG. 3 is a schematic perspective view of the present invention fully coupled to the machine mount.
Figure 4:
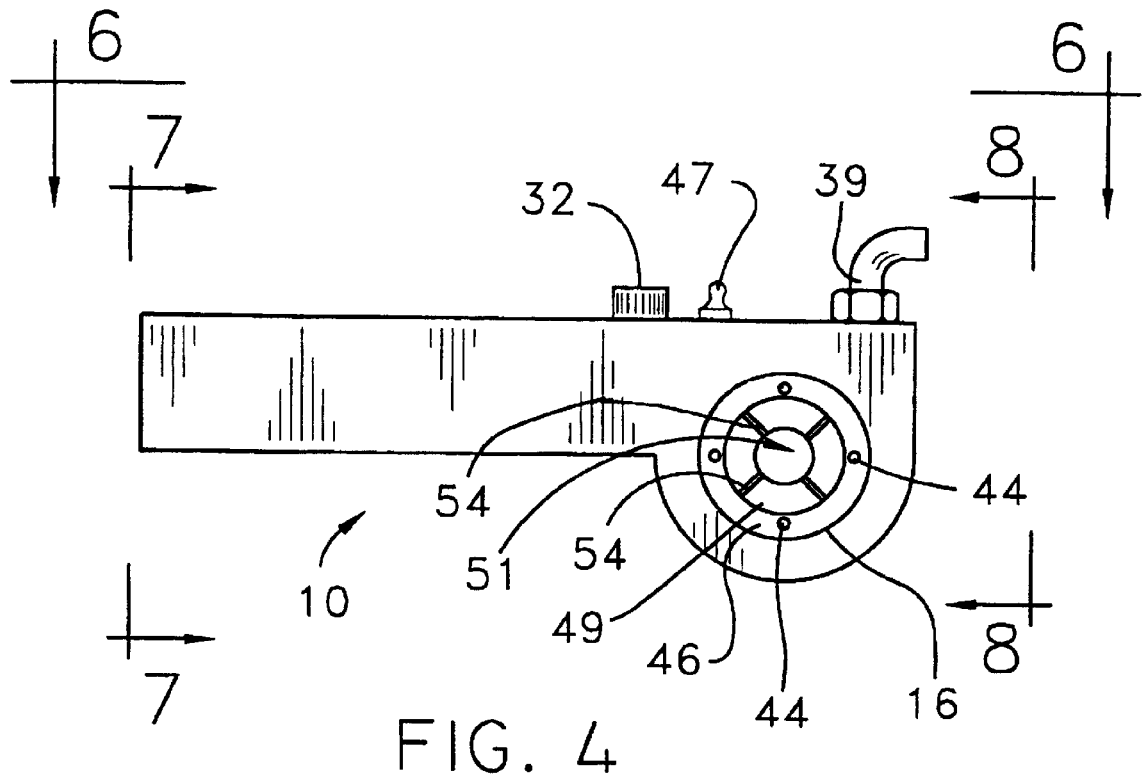
FIG. 4 is a schematic top view of the present invention.
Figure 5:
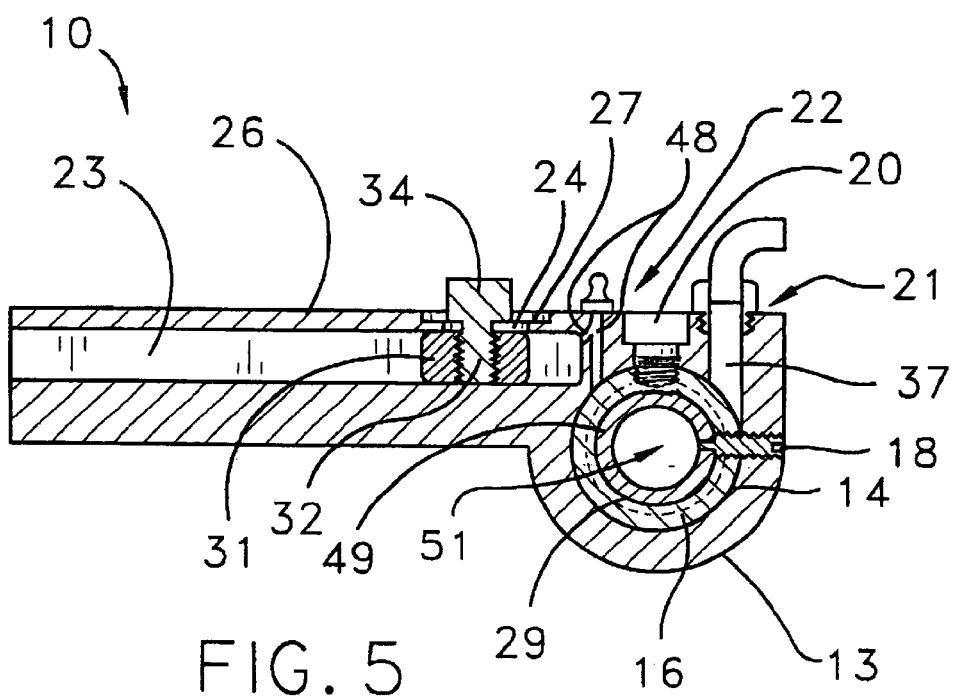
FIG. 5 is a schematic cross-sectional top view of the present invention.
Figure 9:
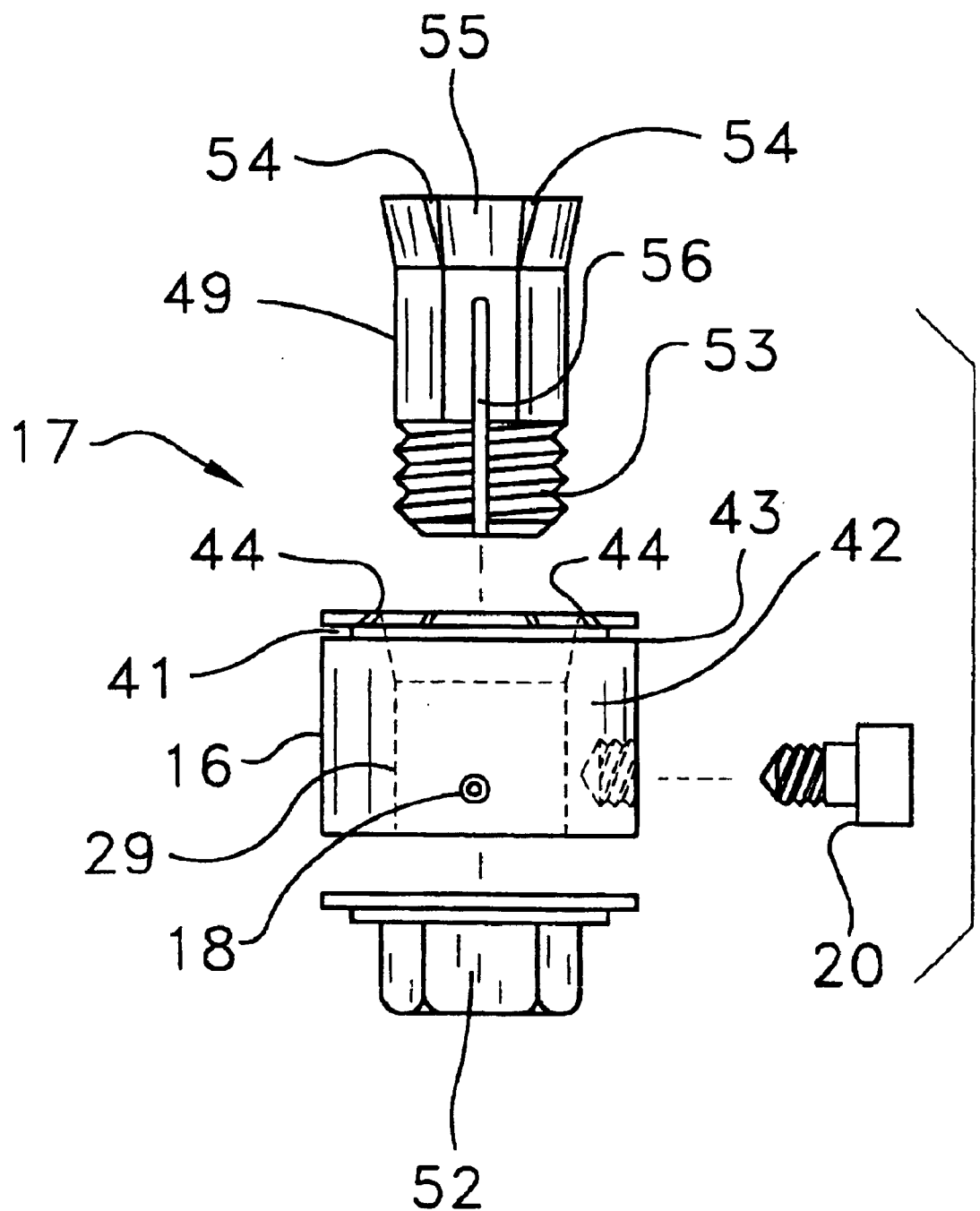
FIG. 9 is a schematic exploded view of the collet assembly and the collet retainer member of the present invention.

With reference now to the drawings, and in particular to FIGS. 1 through 9 thereof, a new machine tool support apparatus embodying the principles and concepts of the present invention and generally designated by the reference numeral 10 will be described.

As best illustrated in FIGS. 1 through 9, the tool holder 10 generally comprises an apparatus for mounting machine tools 6 such as drills, end mills, boring bars, internal threading tools, face grooving tools, etc. to a machine in which a work piece is rotated about an axis (and shaped by the machine tool 6) such as a metal lathe, a multi-rotational lathe or a computer numeric controlled (CNC) lathe.

The apparatus comprises an elongate bar member 11 that comprises a mounting portion 12 and a collet portion. The mounting portion 12 is releasably attachable to a machine mount 5 of a turning machine. The collet portion includes a main aperture 14 that extends therethrough.

A collet retaining member 16 selectively receives one of a plurality of collet assemblies 17 which are releasably attachable to the bar member 11 and secures a machine tool 6 to the machine mount 5 during a machining operation.

A retaining pin 18 restricts rotational movement of each of the collet assemblies 17 with respect to the bar member 11.

A positioning assembly 19 selectively positions the bar member 11 along a longitudinal axis of the bar member 11 with respect to the machine mount 5.

A coolant assembly 21 applies coolant to the machine tool 6 during the machining operation.

A lubrication assembly 22 permits selective lubrication of the main aperture 14 of the collet portion and the positioning assembly 19.

The mounting portion 12 of the bar member 11 has a generally rectangular cross section as taken perpendicular to the longitudinal axis of the bar member 11 such that the mounting portion 12 is positionable in the machine mount 5.

The mounting portion 12 of the bar member 11 has a bore 23 that extends from an end of the mounting portion 12 inward towards the collet portion.

The mounting portion 12 of the bar member 11 has an elongate positioning slot 24 that extends through a side 26 of the bar member 11 and into the bore 23. The positioning slot 24 has a recessed ledge portion 27 that extends about a perimeter edge thereof.

The collet portion of the bar member 11 comprises a lobe 28 for conforming to the collet retaining member 16.

The collet retaining member 16 is mounted in the main aperture 14 of the collet portion of the bar member 11. The collet retaining member 16 includes a collet aperture 29 that extends therethrough.

A fastening member 20 selectively secures the collet retaining member 16 in the main aperture 14 of the collet portion 13 of the bar member 11. The fastening member 20 is threadably couplable to the collet retaining member 16 through the side 26 of the bar member.

The positioning assembly 19 comprises a dowel member 31 and a positioning bolt 32. The dowel member 31 is slidably positionable in the bore 23 of the mounting portion 12 of the bar member 11. The dowel member 31 has a threaded hole 33 that extends therethrough such that the positioning bolt 32 is threadably couplable to the dowel member 31 when the dowel member 31 is positioned adjacent to the positioning slot 24 in the mounting portion 12.

A head portion 34 of the positioning bolt 32 is positionable on the ledge portion 27 of the positioning slot 24 such that the positioning bolt 32 is movably securable along a length of the positioning slot 24 when coupled to the dowel member 31.

The positioning bolt 32 abuts an outer face 7 of the machine mount 5 when the mounting portion 12 of the bar member 11 is positioned in the machine mount 5 such that a position of the positioning bolt 32 on the bar member 11 correlates to a location of the machine tool 6 with respect to the machine mount 5.

The coolant assembly 21 includes a coolant tube 36 for transferring coolant from the machine mount 5 to a coolant conduit 37 in the collet portion of the bar member 11. A first end 38 of the coolant tube 36 is releasably attachable to a coolant supply port 8 of the machine mount 5. A second end 39 of the coolant tube 36 is mounted on the collet portion of the bar member 11.

The coolant assembly 21 includes an annular coolant channel 41 that extends into an outer surface 42 of the collet retaining member 16 and is positioned proximate to an upper side 43 of the collet retaining member 16. The coolant channel 41 is in fluid communication with the coolant conduit 37 of the collet portion.

The coolant assembly 21 includes a plurality of coolant apertures 44 that extend through the upper side 43 of the collet retaining member 16 and is in fluid communication with the coolant channel 41. Each of the coolant apertures 44 is positioned about an outer portion 46 of the collet retaining member 16 and is skewed such that coolant is directed inward towards the machine tool 6.

The lubrication assembly 22 comprises a lubrication fitting that is mounted on the bar member 11, and a pair of passages 48 in fluid communication with the positioning assembly 19 and the collet retaining member 16.

The retaining pin 18 is threadably coupled to the mounting portion 12 of the bar member 11 and extends inward through the collet retaining member 16 and protrude into the collet aperture 29 of the collet retaining member 16.

Each of the collet assemblies 17 comprises an elongate collet member 49 that has a tool aperture 51 that extends therethrough along a longitudinal axis of the collet member 49, and a collet nut 52 for selectively coupling to a threaded portion 53 of the collet member 49.

The collet member 49 has a plurality of slits 54 that are located about a circumference of a securing portion 55 of the collet member 49. A diameter of the tool aperture 51 at the securing portion 55 of the collet member 49 decreases when the securing portion 55 is drawn into the collet aperture 29 of the collet retaining member 16 by the collet nut 52 for the purpose of securing the machine tool 6 to the bar member 11.

The collet member 49 has a collet slot 56 that extends into the tool aperture 51 for receiving the retaining pin 18 member when positioned in the collet retaining member 16.

The collet slot 56 extends from the threaded portion 53 of the collet towards the securing portion 55 and is orientated substantially parallel to the longitudinal axis of the collet member 49.

In use, a user may set up a lathe or boring machine for use by sliding the mounting portion 12 of the bar member 11 into the machine mount 5 until the head portion 34 of the positioning bolt 32 abuts the outer face 7 of the machine mount 5, then locks down the machine mount. The ease of mounting the device can be anticipated when compared to the current method of holding a tool holding block to the machine mount 12 and inserting and tightening four mounting screws as is currently practiced.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A machine tool support apparatus for attaching a machine tool to a machine mount of a turning machine, said apparatus comprising:

an elongate bar member comprising a mounting portion and a collet portion, said mounting portion being releasably attachable to a machine mount of a turning machine, said collet portion including a main aperture extending therethrough;

a collet retaining member for selectively receiving one of a plurality of collet assemblies;

a retaining pin for restricting rotational movement of each of said collet assemblies with respect to said bar member;

a positioning assembly for selectively positioning said bar member along a longitudinal axis of said bar member with respect to the machine mount;

a coolant assembly for applying coolant to the machine tool during a machining operation;

a lubrication assembly for permitting selective lubrication of said main aperture of said collet portion and said positioning assembly;

said mounting portion of said bar member having a bore extending from an end of said mounting portion inwardly towards said collet portion;

said mounting portion of said bar member having an elongate positioning slot extending through a side of said bar member and into said bore, said positioning slot having a recessed ledge portion extending about a perimeter edge thereof;

said positioning assembly comprising a dowel member and a positioning bolt, said dowel member being slidably positionable in said bore of said mounting portion of said bar member, said dowel member having a threaded hole extending therethrough such that said positioning bolt is threadable couplable to said dowel member when said dowel member is positioned adjacent to said positioning slot in said mounting portion; and a head portion of said positioning bolt being positionable on said ledge portion of said positioning slot such that said positioning bolt is movably securable along a length of said positioning slot when coupled to said dowel member.

2. The machine tool support apparatus as set forth in claim 1, further comprising said mounting portion of said bar member having a generally rectangular cross section as taken perpendicular to the longitudinal axis of said bar member such that said mounting portion is positionable in the machine mount.

3. The machine tool support apparatus as set forth in claim 1, further comprising said collet portion of said bar member comprising a lobe for conforming to said collet retaining member.

4. The machine tool support apparatus as set forth in claim 1, further comprising said collet retaining member being mounted in said main aperture of said collet portion of said bar member, said collet retaining member including a collet aperture extending therethrough.

5. The machine tool support apparatus as set forth in claim 4, further comprising said retaining pin being threadably coupled to said mounting portion of said bar member and extending inwardly through said collet retaining member and protruding into said collet aperture of said collet retaining member.

6. The machine tool support apparatus as set forth in claim 5, further comprising each of said collet assemblies comprising an elongate collet member having a tool aperture extending therethrough along a longitudinal axis of said collet member, and a collet nut for selectively coupling to a threaded portion of said collet member.

7. The machine tool support apparatus as set forth in claim 6, further comprising said collet member having a plurality of slits being located about a circumference of a securing portion of said collet member, wherein a diameter of said tool aperture at said securing portion of said collet member decreases when said securing portion is drawn into said collet aperture of said collet retaining member by said collet nut for the purpose of securing the machine tool to said bar member.

8. The machine tool support apparatus as set forth in claim 7, further comprising said collet member having a collet slot extending into said tool aperture for receiving said retaining pin member when positioned in said collet retaining member.

9. The machine tool support apparatus as set forth in claim 8, further comprising said collet slot extending from said threaded portion of said collet towards said securing portion and being orientated substantially parallel to the longitudinal axis of said collet member.

10. The machine tool support apparatus as set forth in claim 1, wherein said positioning bolt abuts an outer face of the machine mount when said mounting portion of said bar member is positioned in the machine mount such that a position of said positioning bolt on said bar member correlates to a location of the machine tool with respect to the machine mount.

11. The machine tool support apparatus as set forth in claim 1, further comprising said coolant assembly including a coolant tube for transferring coolant from the machine mount to a coolant conduit in said collet portion of said bar member, a first end of said coolant tube being releasably attachable to a coolant supply port of the machine mount, a second end of said coolant tube being mounted on said collet portion of said bar member.

12. The machine tool support apparatus as set forth in claim 11, further comprising said coolant assembly including an angular coolant channel extending into an outer surface of said collet retaining member and being positioned proximate to an upper side of said collet retaining member, said coolant channel being in fluid communication with said coolant conduit of said collet portion.

13. The machine tool support apparatus as set forth in claim 12, further comprising said coolant assembly including a plurality of coolant apertures extending through said upper side of said collet retaining member and being in fluid communication with said coolant channel, each of said coolant apertures being positioned about an outer portion of said collet retaining member and being skewed such that coolant is directed inward towards the machine tool.

14. The machine tool support apparatus as set forth in claim 1, further comprising said lubrication assembly comprising a lubrication fitting being mounted on said bar member and a pair of passages being in fluid communication with said positioning assembly and said collet retaining member.

15. The machine tool support apparatus as set forth in claim 1, further comprising a fastening member for selectively securing said collet retaining member in said main aperture of said collet portion of said bar member, said fastening member being threadably couplable to said collet retaining member through said side of said bar member.

16. A machine tool support apparatus for attaching a machine tool to a machine mount of a turning machine, said apparatus comprising:

an elongate bar member comprising a mounting portion and a collet portion, said mounting portion being releasably attachable to a machine mount of a turning machine, said collet portion including a main aperture extending therethrough;

a collect retaining member for selectively receiving one of a plurality of collet assemblies;

a retaining pin for restricting rotational movement of each of said collet assemblies with respect to said bar member;

a positioning assembly for selectively positioning said bar member along a longitudinal axis of said bar member with respect to the machine mount;

a coolant assembly for applying coolant to the machine tool during a machining operation;

a lubrication assembly for permitting selective lubrication of said main aperture of said collet portion and said positioning assembly;

said mounting portion of said bar member having a generally rectangular cross section as taken perpendicular to the longitudinal axis of said bar member such that said mounting portion is positionable in the machine mount;

said mounting portion of said bar member having a bore extending from an end of said mounting portion inwardly towards said collet portion;

said mounting portion of said bar member having an elongate positioning slot extending through a side of said bar member and into said bore, said positioning slot having a recessed ledge portion extending about a perimeter edge thereof;

a fastening member for selectively securing said collet retaining member in said main aperture of said collet portion of said bar member, said fastening member being threadably couplable to said collet retaining member through said side of said bar member;

said collet portion of said bar member comprising a lobe for conforming to said collet retaining member;

said collet retaining member being mounted in said main aperture of said collet portion of said bar member, said collet retaining member including a collet aperture extending therethrough;

said positioning assembly comprising a dowel member and a positioning bolt, said dowel member being slidably positionable in said bore of said mounting portion of said bar member, said dowel member having a threaded hole extending therethrough such that said positioning bolt is threadably couplable to said dowel member when said dowel member is positioned adjacent to said positioning slot in said mounting portion;

a head portion of said positioning bolt being positionable on said ledge portion of said positioning slot such that said positioning bolt is movably securable along a length of said positioning slot when coupled to said dowel member;

wherein said positioning bolt abuts an outer face of the machine mount when said mounting portion of said bar member is positioned in the machine mount such that a position of said positioning bolt on said bar member correlates to a location of the machine tool with respect to the machine mount;

said coolant assembly including a coolant tube for transferring coolant from the machine mount to a coolant conduit in said collet portion of said bar member, a first end of said coolant tube being releasably attachable to a coolant supply port of the machine mount, a second end of said coolant tube being mounted on said collet portion of said bar member;

said coolant assembly including an annular coolant channel extending into an outer surface of said collet retaining member and being positioned proximate to an upper side of said collet retaining member, said coolant channel being in fluid communication with said coolant conduit of said collet portion;

said coolant assembly including a plurality of coolant apertures extending through said upper side of said collet retaining member and being in fluid communication with said coolant channel, each of said coolant apertures being positioned about an outer portion of said collet retaining member and being skewed such that coolant is directed inward towards the machine tool;

said lubrication assembly comprising a lubrication fitting being mounted on said bar member and a pair of passages being in fluid communication with said positioning assembly and said collet retaining member;

said retaining pin being threadably coupled to said mounting portion of said bar member and extending inwardly through said collet retaining member and protruding into said collet aperture of said collet retaining member;

each of said collet assemblies comprising an elongate collet member having a tool aperture extending therethrough along a longitudinal axis of said collet member, and a collet nut for selectively coupling to a threaded portion of said collet member;

said collet member having a plurality of slits being located about a circumference of a securing portion of said collet member, wherein a diameter of said tool aperture at said securing portion of said collet member decreases when said securing portion is drawn into said collet aperture of said collet retaining member by said collet nut for the purpose of securing the machine tool to said bar member;

said collet member having a collet slot extending into said tool aperture for receiving said retaining pin member when positioned in said collet retaining member; and said collet slot extending from said threaded portion of said collet towards said securing portion and being orientated substantially parallel to the longitudinal axis of said collet member.

17. A machine tool support apparatus for attaching a machine tool to a machine mount of a turning machine, said apparatus comprising:

an elongate bar member comprising a mounting portion and a collet portion, said mounting portion being releasably attachable to a machine mount of a turning machine, said collet portion including a main aperture extending therethrough;

a collet retaining member for selectively receiving one of a plurality of collet assemblies;

a retaining pin for restricting rotational movement of each of said collet assemblies with respect to said bar member;

a positioning assembly for selectively positioning said bar member along a longitudinal axis of said bar member with respect to the machine mount;

a coolant assembly for applying coolant to the machine tool during a machining operation;

a lubrication assembly for permitting selective lubrication of said main aperture of said collet portion and said positioning assembly;

said mounting portion of said bar member having a bore extending from an end of said mounting portion inwardly towards said collet portion;

said mounting portion of said bar member having an elongate positioning slot extending through a side of said bar member and into said bore, said positioning slot having a recessed ledge portion extending about a perimeter edge thereof;

said positioning assembly comprising a dowel member and a positioning bolt, said dowel member being slidably positionable in said bore of said mounting portion of said bar member, said dowel member having a threaded hole extending therethrough such that said positioning bolt is threadably couplable to said dowel member when said dowel member is positioned adjacent to said positioning slot in said mounting portion; and said positioning bolt abutting an outer face of the machine mount when said mounting portion of said bar member is positioned in the machine mount such that a position of said positioning bolt on said member correlates to a location of the machine tool with respect to the machine mount.

18. The machine tool support apparatus as set forth in claim 17, further comprising a fastening member for selectively securing said collet retaining member in said main aperture of said collet portion of said bar member, said fastening member being threadably couplable to said collet retaining member through said side of said bar member.

* * * * *